(12) United States Patent
Tsuruta

(10) Patent No.: US 6,850,711 B2
(45) Date of Patent: Feb. 1, 2005

(54) UNUSED BAND USE RIGHT ACQUISITION CONTROLLING METHOD AND PASSIVE OPTICAL NETWORK FOR THE SAME

(75) Inventor: Atsuo Tsuruta, Tokyo (JP)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 09/899,074

(22) Filed: Jul. 6, 2001

(65) Prior Publication Data

US 2002/0021471 A1 Feb. 21, 2002

(30) Foreign Application Priority Data

Jul. 6, 2000 (JP) ........................................ 2000-204731

(51) Int. Cl.[7] .............................................. H04B 10/00
(52) U.S. Cl. ......................... 398/168; 398/58; 398/67; 398/69; 398/70; 398/71; 398/72; 398/98; 398/100; 370/468; 370/395.1; 370/395.43; 370/442; 370/447; 370/229; 370/230; 370/432; 370/437; 725/138; 725/105
(58) Field of Search ........................... 398/168, 58, 67, 398/69, 70, 71, 72, 98, 100; 370/468, 395.1, 395.43, 442, 447, 229, 230, 432, 437; 725/138, 105

(56) References Cited

U.S. PATENT DOCUMENTS 6,633,541 B1 * 10/2003 Hijikata et al. ............. 370/231
6,747,990 B1 * 6/2004 Umayabashi et al. ....... 370/468

FOREIGN PATENT DOCUMENTS

| EP | 0 961 522 A | 12/1999 |
| JP | 11-98151 | 4/1999 |
| JP | 11-187037 | 7/1999 |
| JP | 11-215146 | 8/1999 |
| JP | 11-355301 | 12/1999 |
| JP | 2000-4461 | 1/2000 |
| JP | 2000-188603 A | 7/2000 |
| WO | WO 99 23791 A | 5/1999 |

* cited by examiner

*Primary Examiner*—Hanh Phan
(74) *Attorney, Agent, or Firm*—Sughrue Mion, PLLC

(57) ABSTRACT

A passive optical network (PON) including an optical line termination (OLT) and a plurality of optical network units (ONUs) which are connected. The optical line termination includes a band setting control section; an upstream control cell receiving section; a use right transmitting section; and a downstream control cell transmitting section. Each of the plurality of optical network units includes a downstream control cell receiving section; a use right acquisition determining section; and an upstream control cell transmitting section.

21 Claims, 2 Drawing Sheets

UNUSED BAND USE RIGHT ACQUISITION CONTROLLING METHOD AND PASSIVE OPTICAL NETWORK FOR THE SAME

BACKGROUND OF THE INVENTION

1. Field of the Invention

The present invention relates to an unused band use right acquisition controlling method and a passive optical network for the same.

2. Description of the Related Art

An ATM (Asynchronous Transfer Mode) network is conventionally known which is used as a root technique of a B-ISDN. Also, as one of an optical subscriber system network which links between the ATM network and a terminal of a user, a PON (Passive Optical Network) is known.

The passive optical network (PON) is installed in a station of the NTT, for example, and an optical line termination (OLT) and an optical network unit (ONU) are connected with the ATM network are connected by an optical fiber. At this time, the route of the optical fiber is branched on the way by a star coupler and a plurality of optical network units (ONUs) are connected to one optical line termination (OLT).

By the way, in ITU-T G.983 which is the standards to prescribe an interface with the optical subscriber in the ATM network, a band in the upstream direction (direction from the optical network unit (ONU) to the optical line termination (OLT)) is determined in accordance with an instruction from the optical line termination (OLT). However, in a usual operation, there is a band which is not used by each optical network unit (ONU).

Conventionally, there is a problem that effective use is not made, because the unused band is used only when the band use capacity of other optical network units (ONUs) increases or optical network unit (ONU) is added.

In conjunction with the above description, an optical communication apparatus is disclosed in Japanese Laid Open Patent application (JP-A-Heisei 11-98151). In this example, the optical communication equipment carries out optical communication using an upstream channel and a downstream channel which are provided between a subscriber terminal apparatus and a station apparatus. A transmitting section is provided in the station apparatus of the optical communication apparatus to transmit a subscriber ID and a polling instruction to the subscriber terminal apparatus based on predetermined subscriber data. The sending-out section sends out a transmission request transmitted from the subscriber terminal apparatus and a transmission permission signal to a shared band in the upstream channel which is preset in case of the reception of the subscriber ID to the subscriber terminal apparatus, in response to the polling instruction. A calculating section calculates the packet length of a packet signal transmitted from the subscriber terminal apparatus in response to the transmission permission signal. A control section controls the sending-out section to send out the transmission permission signal for the time determined based on the packet length calculated by the calculating section.

Also, a cell delay change restraint band setting apparatus is elucidated to Japanese Laid Open Patent application (JP-A-Heisei 11-187037). In the cell delay change restraint band setting apparatus of this reference, an input unit inputs a combination of remote device numbers of a plurality of remote units, the number of cell allocations in a band management frame and an offset of each cell allocation and a magnification value. An ideal band setting calculation processing section calculates the number of empty cells in the band management frame from a combination of the remote device numbers and the number of cell allocations in the band management frame, and determines the existence or non-existence of the cell allocation to each of the remote units. The ideal band setting calculation processing section divides the band management frame by the number of cell allocations when there is the cell allocation, multiplies the dividing result by the magnification value and calculates a temporary ideal cell interval. The ideal band setting calculation processing section stores in an ideal band table as a cell sending-out number, a value of the integral part of a value obtained by dividing the offset value by the magnification value. The ideal band setting calculation processing section carries out the above processing for all cell allocations and for all the remote units to store as an ideal band table group. An allocation processing section extracts the cell sending-out numbers of some allocation cell from the ideal band table group and arranges them in the ascending order. The allocation processing section repeats this processing for all the remote units and produces tables in which the extracted cell sending-out numbers are arranged. The allocation processing section searches the existence or non-existence of the cell allocation in the ascending order, and executes the allocation processing to arrange the remote unit number of the cell allocation in a band setting table in order. The allocation processing section executes this processing to all of the tables.

Also, a method of transmitting an ATM cell through a passive optical network is disclosed in Japanese Laid Open Patent application (JP-A-Heisei 11-215146). In this reference, an ATM cell is transmitted from the ATM network to a light network apparatus in the passive light network connected with the ATM network. An optical subscriber apparatus interposed between the ATM network and the passive light network operates:

a. to store a light network device identification data which specifies the light network apparatus as the object of unicast, and a cryptography key corresponding to the light network apparatus, and to store an emulated local area network identification data specifying each group of the light network apparatuses as the object of the multicast and a cryptography key corresponding to the group, b. when the broadcast of the ATM cell to all the light network apparatuses connected with the passive light network, to add an identification data indicative of the broadcast to the ATM cell as the light network device identification data and send out to the passive light network as an ATM passive optical network (PON) frame, c. when carrying out the multicast of the ATM cell to the light network apparatuses of a specific group connected with the passive light network, to add the emulated local area network identification data specifying the group to this ATM cell and then to carry out cryptography processing based on the cryptography key corresponding to the group, to add an identification data indicative of the multicast as the light network device identification data and to send out to the passive light network as the ATM passive optical network (PON) frame, and d. when carrying out the unicast of the ATM cell to the specific light network apparatus connected with the passive light network, to carry out cryptography processing based on the cryptography key corresponding to the light network apparatus to the ATM cell, and to add the light network device identification data specifying the light network apparatus to the ATM cell, and then to send out to the passive light network as the ATM passive optical network (PON) frame. Each light network apparatus connected with the passive light network operates:

e. to store the cryptography key for the unicast used when the unicast is carried out to the light network apparatus, and to store the cryptography key for the multicast used when the multicast is carried out to each group of the light network apparatuses as the object of the multicast, f. when the ATM passive optical network (PON) frame arrived through the passive light network contains the light network device identification data corresponding to the light network apparatus, to unicast receive the ATM cell contained in the ATM passive optical network (PON) frame using the cryptography key for the unicast corresponding to the light network apparatus, g. when the ATM passive optical network (PON) frame which arrived through the passive light network contains the identification data indicative of the broadcast as the light network device identification data, to broadcast receives the ATM cell contained in the ATM passive optical network (PON) frame, and h. when the ATM passive optical network (PON) frame which arrived through the passive light network contains the identification data indicative of the multicast as the light network device identification data, to multicast receive the ATM cell contained in the ATM passive optical network (PON) frame using each cryptography key set for every group.

Also, a band change setting method is disclosed in Japanese Laid Open Patent application (JP-A-Heisei 11-355301). In the band change setting method of this reference, a plurality of subscriber apparatuses are connected with a same line and an in-station apparatus and each subscriber apparatus carry out bidirectional communication. The subscriber apparatus produces a data cell when the upstream data to the in-station apparatus exists, and produces a dummy cell when the upstream data does not exist. The subscriber apparatus sends out the produced cell to the in-station apparatus in accordance with an upstream signal sending-out timing sent out from the in-station apparatus. The in-station apparatus counts the dummy cells and data cells received from each subscriber apparatus every subscriber apparatus. The in-station apparatus carries out a resetting operation of the band allocation to reduce the allocated band to the subscriber apparatus when there are many dummy cells, and to increase the allocated band to the subscriber apparatus within a predetermined upper limit value when there are many data cells. Thus, the in-station apparatus sends out the upstream signal sending-out timing determined based on this resetting operation to each subscriber apparatus.

Also, an optical communication channel switching system is disclosed in Japanese Laid Open Patent Application (JP-A-2000-4461). In this reference, a crossing connection apparatus (XC) previously stores channel data corresponding to the band change setting due to the addition or removal of a subscriber apparatus (19 to 21). The channel termination apparatus (17a, 17b) carries out the band change setting of a transmission capacity and phase due to the addition or removal of a subscriber apparatus (19 to 21) based on band change data (S16) from a channel switching control section (18). Moreover, the channel termination apparatus notifies the band change setting to the crossing connection apparatus (XC) at the same time. In response to this notice, the crossing connection apparatus (XC) carries out based on the stored channel data the channel change without temporal down during the operation such that the TDMA time slots are changed in accordance with the band change setting due to the addition or removal of the subscriber apparatus (19 to 21) by the channel termination apparatus (17a, 17b).

SUMMARY OF THE INVENTION

Therefore, an object of the present invention is to provide an unused band use right acquisition controlling method of effectively using an unused band in an upstream band, and a passive optical network (PON) for the same.

In an aspect of the present invention, a method of using an unused band in a passive optical network (PON) in which an optical line termination (OLT) and a plurality of optical network units (ONUs) are connected, is attained by (a) determining existence of an unused band in an upstream path in the optical line termination; by (b) transmitting a use right data from the optical line termination to a specific one of the plurality of optical network units on a downstream path; by (c) determining whether the specific optical network unit uses the unused band, in response to the use right data; by (d) transmitting a reply indicative of use of the unused band from the specific optical network unit to the optical line termination on an upstream path, when it is determined that the specific optical network unit uses the unused band; by (e) setting the use of the unused band in response to the reply indicative of the use of the unused band; by (f) transmitting the setting of the use of the unused band from the optical line termination to the specific optical network unit on the downstream path such that the specific optical network unit can use the unused band.

Here, the (c) determining step may be attained by determining whether the specific optical network unit uses the unused band, based on a quantity of remaining cells to be transmitted on the upstream path.

Also, the (c) determining step may be attained by determining whether the specific optical network unit uses the unused band, based on a band allocation change signal externally supplied.

Also, the (d) transmitting step may further include the step of: transmitting the reply indicative of discard of the use right from the specific optical network unit to the optical line termination on an upstream path, when it is determined that the specific optical network unit does not use the unused band. Also, the (b) transmitting step may further includes the steps of: selecting as a new specific optical network unit, a next one of the plurality of optical network units other than the specific optical network unit; and transmitting the use right data from the optical line termination to the new specific optical network unit on the downstream path. In this case, the method may further include the step of: repeating the steps (b) to (c) until the optical line termination receives the replies indicative of the use of a whole of the unused band.

Also, the (b) transmitting step may further include the steps of: selecting as a new specific optical network unit, a next one of the plurality of optical network units other than the specific optical network unit, when the replay indicates the use of a part of the unused band; and transmitting the use right data from the optical line termination to the new specific optical network unit on the downstream path. In this case, the method may further include the step of: repeating the steps (b) to (c) until the optical line termination receives the replies indicative of the use of a whole of the unused band.

Also, the use right data may include data of the unused band and data of a time during which the unused band can be used.

Also, the (d) transmitting step may further include the step of: transmitting the reply including an inquiry of a content of the use right about the unused band from the specific optical network unit to the optical line termination on an upstream path, when the use right data does not include data of the unused band and data of a time during which the unused band can be used. Also, the (b) transmitting step may further include the step of: transmitting the content of the use right in place of the use right data from the optical line termination to the specific optical network unit on the downstream path.

In another aspect of the present invention, a passive optical network (PON) comprising an optical line termination (OLT) and a plurality of optical network units (ONUs) which are connected. The optical line termination includes a band setting control section which determines existence of an unused band in an upstream path; an upstream control cell receiving section which issues a use right issuance instruction signal when it is determined that there is the unused band; a use right transmitting section which selects a specific one of the plurality of optical network units; and a downstream control cell transmitting section which transmitting a downstream signal including a use right data from the optical line termination to the specific optical network unit on a downstream path. Each of the plurality of optical network units includes a downstream control cell receiving section which receives the downstream signal destined to itself and extracts the use right data from the downstream signal; a use right acquisition determining section which determines whether the network unit uses the unused band, based on the use right data, and produce a use right acquisition instruction signal including a reply as the determining result; and an upstream control cell transmitting section which transmits an upstream signal including the reply to the optical line termination on an upstream path.

Here, the upstream control cell receiving section may generate a band allocation setting signal to the band setting control section based on the reply. The band setting control section may set the use of the unused band in response to the band allocation setting signal and outputs a bans setting signal to the downstream control cell transmitting section. The downstream control cell transmitting section may transmit the setting of the use of the unused band to the specific optical network unit on the downstream path such that the specific optical network unit can use the unused band. The use right acquisition determining section determines whether the specific optical network unit uses the unused band, based on a quantity of remaining cells to be transmitted on the upstream path.

Also, the use right acquisition determining section may determine whether the specific optical network unit uses the unused band, based on a band allocation change signal externally supplied.

Also, the use right acquisition determining section may output the reply indicative of use of the unused band to the upstream control cell transmitting section, when it is determined that the specific optical network unit uses the unused band.

Also, the use right acquisition determining section may output the reply indicative of discard of the use right to the upstream control cell transmitting section, when it is determined that the specific optical network unit does not use the unused band.

Also, the use right acquisition determining section may output the reply indicative of partial use of the unused band to the upstream control cell transmitting section, when it is determined that the specific optical network unit uses the unused band partially.

Also, the upstream control cell receiving section may issue the use right issuance instruction signal when the reply indicative of the discard of the use right is received from the upstream signal.

Also, the upstream control cell receiving section may issue a band setting instruction signal when the reply indicative of the use of the unused band is received from the upstream signal. In this case, the band setting control section may set the use of the unused band in response to the band allocation setting signal and outputs a bans setting signal to the downstream control cell transmitting section, and the downstream control cell transmitting section may transmit the setting of the use of the unused band to the specific optical network unit on the downstream path such that the specific optical network unit can use the unused band.

Also, the upstream control cell receiving section may issue the use right issuance instruction signal and a band setting instruction signal when the reply indicative of the partial use of the unused band. In this case, the band setting control section may set the use of the unused band in response to the band allocation setting signal and outputs a bans setting signal to the downstream control cell transmitting section. Also, the downstream control cell transmitting section may transmit the setting of the use of the unused band to the specific optical network unit on the downstream path such that the specific optical network unit can use the unused band.

Also, the use right data may include data of the unused band and data of a time during which the unused band can be used.

Also, the use right acquisition determining section may produce the reply including an inquiry of a content of the use right about the unused band when the use right data does not include data of the unused band and data of a time during which the unused band can be used. In this case, the content of the use right from the optical line termination to the specific optical network unit on the downstream path.

DESCRIPTION OF THE PREFERRED EMBODIMENTS

Hereinafter, an unused band use right acquisition controlling method in a passive optical network (PON) of the present invention will be described with reference to the attached drawings.

Figure 1:
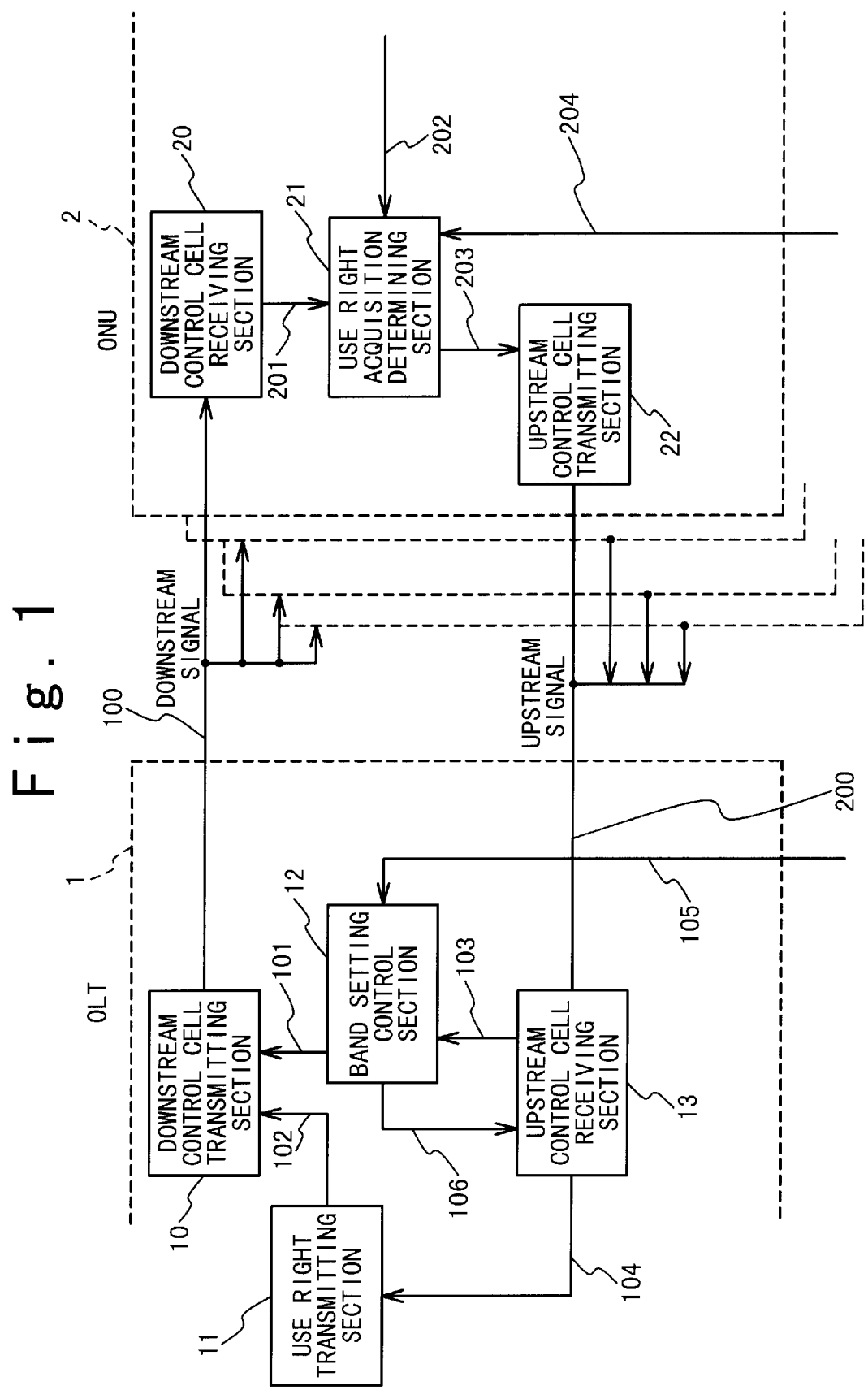
FIG. 1 is a block diagram showing the internal structures of an optical line termination (OLT) and an optical network unit (ONU) in a passive optical network (PON) according to an embodiment of the present invention.

FIG. 1 is a block diagram showing the structure of the passive optical network (PON) in an embodiment. Referring to FIG. 1, the passive optical network (PON) is composed of an optical line termination (OLT) and a plurality of optical network units (ONUs). The unused band use right acquisition controlling method of the present invention is applied to the passive optical network (PON).

The optical line termination (OLT) 1 is composed of a downstream control cell transmitting section 10, a use right transmitting section 11, a band setting control section 12 and upstream control cell receiving section 13.

Also, each of the plurality of optical network units (ONUs) 2 is composed of a downstream control cell receiving section 20, a use right acquisition determining section 21 and an upstream control cell transmitting section 22.

The band setting control section 12 inputs a band allocation instruction signal 103 which is outputted from the upstream control cell receiving section 13, or a band allocation instruction external signal 105, outputs a use right issuance permission signal 106 to the upstream control cell receiving section 13, and outputs a band setting signal 101 to the downstream control cell transmitting section 10.

The upstream control cell receiving section 13 outputs a use right issuance instruction signal 104 to the use right transmitting section in response to the use right issuance permission signal 106.

The use right transmitting section 11 outputs a use right transmission instruction signal 102 to the downstream control cell transmitting section 10 in response to the use right issuance instruction signal 104 from the upstream control cell receiving section 13.

The downstream control cell transmitting section 10 transmits a downstream signal 100 to the optical network unit(s) (ONU) 2 in response to the use right transmission instruction signal 102 or the band setting signal 101.

The downstream control cell receiving section 20 receives the downstream signal 100 and outputs a use right reception signal 201 to the use right acquisition determining section 21.

The use right acquisition determining section 21 inputs a band allocation change instruction external signal 204 or an upstream signal use situation signal 202, and determines whether the use right should be acquired, in response to the use right reception signal 201. The determining section 21 outputs a use right acquisition instruction signal 203 to the upstream control cell transmitting section 22, when it is determined that the use right should be acquired.

The upstream control cell transmitting section 22 outputs an upstream signal 200 to the upstream control cell receiving section 13, and the upstream signal 200 is received by the receiving section 13.

Next, an operation of the passive optical network (PON) in this embodiment will be described with reference to FIG. 1 and FIG. 2.

Figure 2:
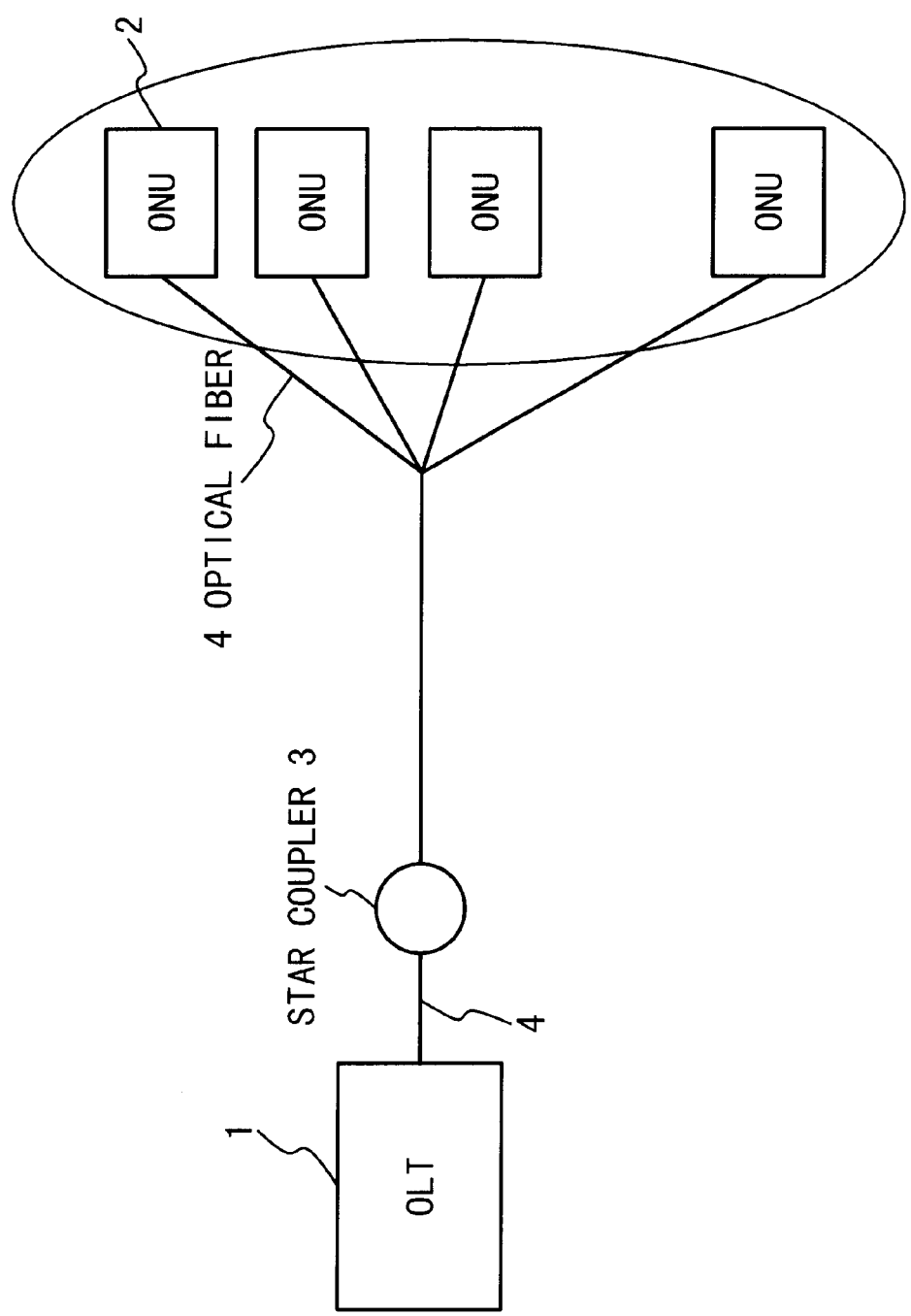
FIG. 2 is a schematic diagram showing the structure of the passive optical network (PON), the optical line termination (OLT) is connected to the optical network units (ONUs) shown in FIG. 1.

FIG. 2 is a schematic diagram showing the structure of the passive optical network (PON) in which the optical line termination (OLT) 1 is connected with the optical network units (ONUs) 2 shown in FIG. 1. As shown in FIG. 2, the optical line termination (OLT) 1 and the plurality of optical network units (ONUs) 2 are connected by an optical fiber 4 through a star coupler 3. The star coupler 3 is a passive optical component which has a function to branch light beams and to combine light beams.

The optical line termination (OLT) 1 and the plurality of optical network units (ONUs) 2 carry out bidirectional communication of the downstream direction (the direction of optical line termination (OLT) optical network unit (ONU)) and the upstream direction (the direction of optical line termination (OLT) optical network unit (ONU)) using the optical fiber 4. Different frequencies are used for the communication into the downstream direction and the communication to the upstream direction. Also, when each of the plurality of optical network units (ONUs) 2 transmits data to the optical line termination (OLT) 1 in the upstream direction, each of the optical network units (ONUs) 2 communicates using the different time zone from those of other optical network units (ONUs).

In this embodiment, in case where an upstream band is set based on ITU-T G.983, when there is an unused band unused by any of optical network units (ONUs), a control signal is transmitted to each optical network unit (ONU) and the acquisition of the use right of the unused band is confirmed. In this way, the optical line termination (OLT) permits the use right of the unused band to an optical network unit (ONU) for a predetermined capacity and for a predetermined time period. Thus, it is made possible to effectively use the unused band. That is, the upstream direction band of the optical network unit (ONU) in ITU-T G.983 is managed by the optical line termination (OLT). The upstream band which is not used by each optical network unit (ONU) exists as the unused band. In this embodiment, the optical line termination (OLT) confirms the acquisition of the use right of the unused band to each optical network unit (ONU) and allocates the use right to a requesting optical network unit(s).

In the system in which the optical line termination (OLT) 1 and the plurality of optical network unit (ONU) 2 are connected with each other through the star coupler 3, as shown in FIG. 2, the band setting control section 12 receives the band allocation instruction external signal 105 and the band allocation instruction signal 103. The band allocation instruction external signal 105 is an externally specified instruction signal for the band setting to each optical network unit (ONU). The band allocation instruction signal 103 is an instruction signal of the band allocation to each optical network unit (ONU) whose signal is determined by the upstream control cell receiving section 13. The band setting control section 12 determines an upstream band quantity which should be allocated to each optical network unit (ONU), in response to the band allocation instruction external signal 105 and the band allocation instruction signal 103.

When a total of allocated bands to the respective optical network units (ONUs) does not exceed an entire upstream band quantity, the band setting control section 12 recognizes that the remaining band is an unused band. The band setting control section 12 calculates the available time period during which the unused band can be used, and outputs as the use right issuance permission signal 106 to the upstream control cell receiving section 13 based on the unused band and the available time period for the unused band.

The upstream control cell receiving section 13 recognizes the unused band and the available time from the use right issuance permission signal 106 and outputs the use right issuance instruction signal 104 to the use right transmitting section 11.

When the use right issuance instruction signal 104 is supplied, the use right transmitting section 11 selects one of the IDs of the optical network units (ONUs), and outputs the use right transmission instruction signal 102 to the downstream control cell transmitting section 10. The use right transmitting section 11 may have a table in which the IDs are stored. The order of the IDs may be determined based on priority levels which are determined based on contracts.

The downstream control cell transmitting section 10 transmits use right data to a specific optical network unit (ONU) having the selected ID as a downstream signal 100. The use right data is received by the downstream control cell receiving section 20 of the specific optical network unit (ONU) 2.

The specific optical network unit (ONU) 2 outputs the received use right data to the use right acquisition determining section 21 as the use right reception signal 201.

The use right acquisition determining section 21 calculates a necessary band allocation quantity and a transmission time period based on the upstream signal use situation signal 202 and the band allocation change instruction external signal 204. The upstream signal use situation signal 202 shows a cell remaining quantity for the upstream signal, and the band allocation change instruction external signal 204 is an instruction signal to provide a specific service. Here, the instruction signal to provide specific service is set based on a contract that an upstream band which is not used by other optical network units (ONUs) can be used. Then, the use right acquisition determining section 21 compares the calculating result with the data shown in the use right reception signal 201.

When determining that the comparing result meets a condition specified by the signal 202 or 204, the use right acquisition determining section 21 outputs the use right acquisition instruction signal 203 to the upstream control cell transmitting section 22 as an instruction to transmit the signal indicating that the use right should be acquired. Also, when determining that the comparing result does not meet the condition, the use right acquisition determining section 21 outputs as the use right acquisition instruction signal 203 to the upstream control cell transmitting section 22 as an instruction to abandon the use right.

The upstream control cell transmitting section 22 transmits data shown by the use right acquisition instruction signal 203 to the optical line termination (OLT) 1 as the upstream signal 200.

In the optical line termination (OLT) 1, when recognizing the upstream signal as the data of the use right acquisition from the upstream signal 200, the upstream control cell receiving section 13 outputs to the band setting section 12, the band allocation instruction signal 103 including the ID of the specific optical network unit (ONU) having acquired the use right, a capacity and a time of the unused band.

At this time, the band setting control section 12 outputs the band setting signal 101 as an instruction signal to allocate the unused band to the specific optical network unit (ONU) to the downstream control cell transmitting section 10.

The downstream control cell transmitting section 10 transmits the downstream signal showing the permission of the use right to the specific optical network unit (ONU) such that the unused band is used by the specific optical network unit (ONU).

Also, the band setting control section 12 determines whether the entire unused band is acquired by the specific optical network unit (ONU) 2, based on the band allocation instruction signal 103. When determining that the entire unused band is acquired by the specific optical network unit (ONU) 2, the band setting control section 12 stops the output of the use right issuance permission signal 106 and the upstream control cell receiving section 13 stops the output of the use right issuance instruction signal 104. However, when determining that the entire unused band is not acquired by the specific optical network unit (ONU) 2, that is, when there is a remaining unused band as the result of the partial use of the unused band by the specific optical network unit (ONU) 2, the band setting control section 12 continues the output of the use right issuance permission signal 106. The upstream control cell receiving section 13 issues the use right issuance instruction signal 104 to the use right transmitting section 11 in response to the use right issuance permission signal 106. Thereafter, the above-mentioned process is repeated.

On the other hand, in the optical line termination (OLT) 1, when the upstream control cell receiving section 13 recognizes the upstream signal as the use right abandonment, the use right issuance instruction signal 104 is outputted once again to the use right transmitting section 11. The use right transmitting section 11 selects the next one of the optical network units (ONU) as a new specific optical network unit and outputs the use right transmission instruction signal 102 to the downstream control cell transmitting section 10.

According to this embodiment, the unused band can be allocated to the usable optical network unit (ONU) so that the unused band can be effectively used.

Next, another embodiment of the unused band use right acquisition controlling method of the present invention will be described. In this embodiment, because the basic structure is same as FIG. 1 and FIG. 2, the description will be made with reference to FIG. 1 and FIG. 2.

In this embodiment, the basic operation is same as the previously shown embodiment. However, when the use right acquisition determining section 21 of the optical network unit (ONU) 2 determines that the contents of the use right reception signal 201 is insufficient and that it is not possible to determine from it that the use right should be acquired, the use right acquisition determining section 21 outputs the use right acquisition instruction signal 203 to the upstream control cell transmitting section 22 to request the optical line termination (OLT) 1 to transmit data about the capacity and the time period of the necessary band. Also, the band allocation instruction signal 103 is transferred from the upstream control cell receiving section 13 of the optical line termination (OLT) 1 to the band setting control section 12. In this way, the band setting control section 12 produces a band capacity and time period corresponding to the request of the optical network unit (ONU) 2 in a possible range.

According to this embodiment, the necessary band capacity and time period are required from the optical network unit (ONU) 2 and the instruction about the unused band can be set in detail.

It should be noted that in the above-mentioned embodiments, transmission signals from the plurality of optical network units (ONUs) are subjected to time division multiplexing in the upstream communication. The method is described above in which an unused band of this time zone is distributed to a requesting optical network unit (ONU). However, the present invention is not limited to this, e.g., the upstream direction signal may be subjected to the other multiplexing methods such as frequency division multiplexing and code division multiple access and these unused bands may be distributed.

It should be noted that the upstream control cell receiving section 13 may determine whether the upstream signal shows the acquisition of the unused band, and stop the output of the use right issuance instruction signal 104 based on the determining result.

As described above, according to the present invention, the unused band use right acquisition controlling method can be provided to effectively use the unused band of the upstream band of the passive optical network (PON). That is, according to the present invention, the unused band is allocated to a usable optical network unit (ONU) so that it is possible to effectively use the unused band.

Also, according to the present invention, the necessary band and time is requested from the optical network unit (ONU) so that more detailed setting is possible about the instruction of the unused band.

What is claimed is:

1. A method of using an unused band in a passive optical network (PON) in which an optical line termination (OLT) and a plurality of optical network units (ONUS) are connected, comprising the steps of:

(a) determining existence of an unused band in an upstream path in said optical line termination;

(b) transmitting a use right data from said optical line termination to a specific one of said plurality of optical network units on a downstream path;

(c) determining whether said specific optical network unit uses said unused band, in response to said use right data;

(d) transmitting a reply indicative of use of said unused band from said specific optical network unit to said optical line termination on an upstream path, when it is determined that said specific optical network unit uses said unused band;

(e) setting the use of said unused band in response to said reply indicative of the use of said unused band;

(f) transmitting said setting of the use of said unused band from said optical line termination to said specific optical network unit on said downstream path such that said specific optical network unit can use said unused band.

2. The method according to claim 1, wherein said (c) determining step comprises the step of:

determining whether said specific optical network unit uses said unused band, based on a quantity of remaining cells to be transmitted on said upstream path.

3. The method according to claim 1, wherein said (c) determining step comprises the step of:

determining whether said specific optical network unit uses said unused band, based on a band allocation change signal externally supplied.

4. The method according to claim 1, wherein said (d) transmitting step further comprises the step of:

transmitting said reply indicative of discard of said use right from said specific optical network unit to said optical line termination on an upstream path, when it is determined that said specific optical network unit does not use said unused band, and said (b) transmitting step further comprises the steps of:
   selecting as a new specific optical network unit, a next one of said plurality of optical network units other than said specific optical network unit; and
   transmitting said use right data from said optical line termination to said new specific optical network unit on said downstream path.

5. The method according to claim 4, further comprising the step of:

repeating said steps (b) to (c) until said optical line termination receives said replies indicative of the use of a whole of said unused band.

6. The method according to claim 1, wherein said (b) transmitting step further comprises the steps of:

selecting as a new specific optical network unit, a next one of said plurality of optical network units other than said specific optical network unit, when said replay indicates the use of a part of said unused band; and transmitting said use right data from said optical line termination to said new specific optical network unit on said downstream path.

7. The method according to claim 6, further comprising the step of:

repeating said steps (b) to (c) until said optical line termination receives said replies indicative of the use of a whole of said unused band.

8. The method according to claim 1, wherein said use right data includes data of said unused band and data of a time during which said unused band can be used.

9. The method according to claim 1, wherein said (d) transmitting step further comprises the step of:

transmitting said reply including an inquiry of a content of said use right about said unused band from said specific optical network unit to said optical line termination on an upstream path, when said use right data does not include data of said unused band and data of a time during which said unused band can be used, said (b) transmitting step further comprises the step of:

transmitting the content of said use right in place of said use right data from said optical line termination to said specific optical network unit on said downstream path.

10. A passive optical network (PON) comprising an optical line termination (OLT) and a plurality of optical network units (ONUs) which are connected, wherein said optical line termination comprises:
    a band setting control section which determines existence of an unused band in an upstream path;
    an upstream control cell receiving section which issues a use right issuance instruction signal when it is determined that there is said unused band;
    a use right transmitting section which selects a specific one of said plurality of optical network units; and
    a downstream control cell transmitting section which transmitting a downstream signal including a use right data from said optical line termination to said specific optical network unit on a downstream path, and wherein each of said plurality of optical network units comprises:
    a downstream control cell receiving section which receives said downstream signal destined to itself and extracts said use right data from said downstream signal;
    a use right acquisition determining section which determines whether said network unit uses said unused band, based on said use right data, and produce a use right acquisition instruction signal including a reply as the determining result; and
    an upstream control cell transmitting section which transmits an upstream signal including said reply to said optical line termination on an upstream path.

11. The passive optical network according to claim 10, wherein said upstream control cell receiving section generates a band allocation setting signal to said band setting control section based on said reply, said band setting control section sets the use of said unused band in response to said band allocation setting signal and outputs a bans setting signal to said downstream control cell transmitting section, and said downstream control cell transmitting section transmits said setting of the use of said unused band to said specific optical network unit on said downstream path such that said specific optical network unit can use said unused band.

12. The passive optical network according to claim 11, wherein said use right acquisition determining section determines whether said specific optical network unit uses said unused band, based on a quantity of remaining cells to be transmitted on said upstream path.

13. The passive optical network according to claim 12, wherein said use right acquisition determining section determines whether said specific optical network unit uses said unused band, based on a band allocation change signal externally supplied.

14. The passive optical network according to claim 10, wherein said use right acquisition determining section outputs said reply indicative of use of said unused band to said upstream control cell transmitting section, when it is determined that said specific optical network unit uses said unused band.

15. The passive optical network according to claim 14, wherein said upstream control cell receiving section issues a band setting instruction signal when said reply indicative of the use of said unused band is received from said upstream signal, said band setting control section sets the use of said unused band in response to said band allocation setting signal and outputs a bans setting signal to said downstream control cell transmitting section, and said downstream control cell transmitting section transmits said setting of the use of said unused band to said specific optical network unit on said downstream path such that said specific optical network unit can use said unused band.

16. The passive optical network according to claim 10, wherein said use right acquisition determining section outputs said reply indicative of discard of said use right to said upstream control cell transmitting section, when it is determined that said specific optical network unit does not use said unused band.

17. The passive optical network according to claim 16, wherein said upstream control cell receiving section issues said use right issuance instruction signal when said reply indicative of the discard of said use right is received from said upstream signal.

18. The passive optical network according to claim 10, wherein said use right acquisition determining section outputs said reply indicative of partial use of said unused band to said upstream control cell transmitting section, when it is determined that said specific optical network unit uses said unused band partially.

19. The passive optical network according to claim 18, wherein said upstream control cell receiving section issues said use right issuance instruction signal and a band setting instruction signal when said reply indicative of the partial use of said unused band, said band setting control section sets the use of said unused band in response to said band allocation setting signal and outputs a bans setting signal to said downstream control cell transmitting section, and said downstream control cell transmitting section transmits said setting of the use of said unused band to said specific optical network unit on said downstream path such that said specific optical network unit can use said unused band.

20. The passive optical network according to claim 10, wherein said use right data includes data of said unused band and data of a time during which said unused band can be used.

21. The passive optical network according to claim 10, wherein said use right acquisition determining section produces said reply including an inquiry of a content of said use right about said unused band when said use right data does not include data of said unused band and data of a time during which said unused band can be used, the content of said use right from said optical line termination to said specific optical network unit on said downstream path.

* * * * *